Figure 8:
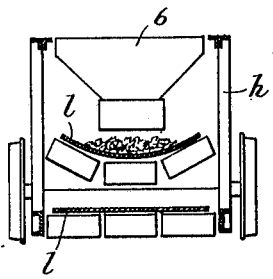

A. GIBB & T. G. MENZIES.
APPARATUS FOR LAYING CONCRETE.
APPLICATION FILED MAR. 29, 1909.
1,004,410.
Patented Sept. 26, 1911.
6 SHEETS—SHEET 1.
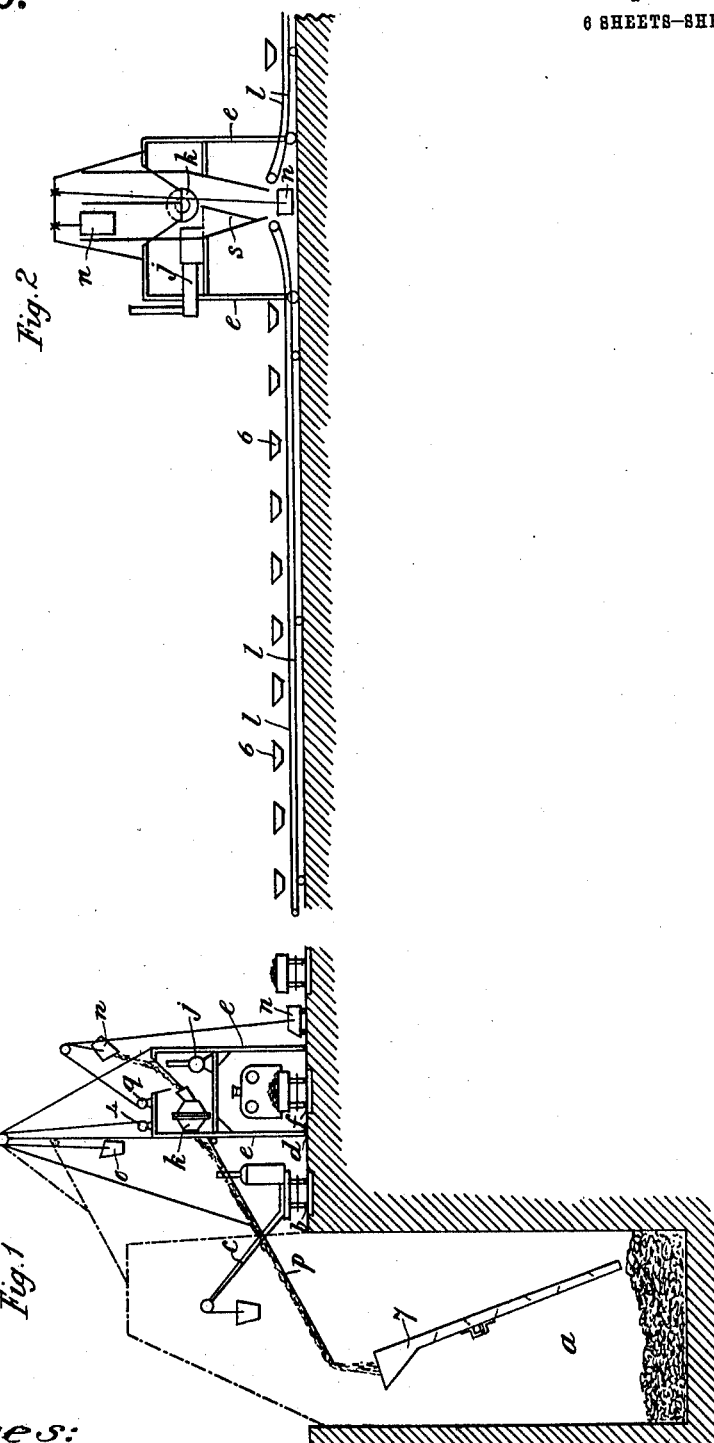
Witnesses:
Otto W. Holmgren.
J. George Barry,
Inventors: Alexander Gibb
Thomas Graham Menzies
by attorneys

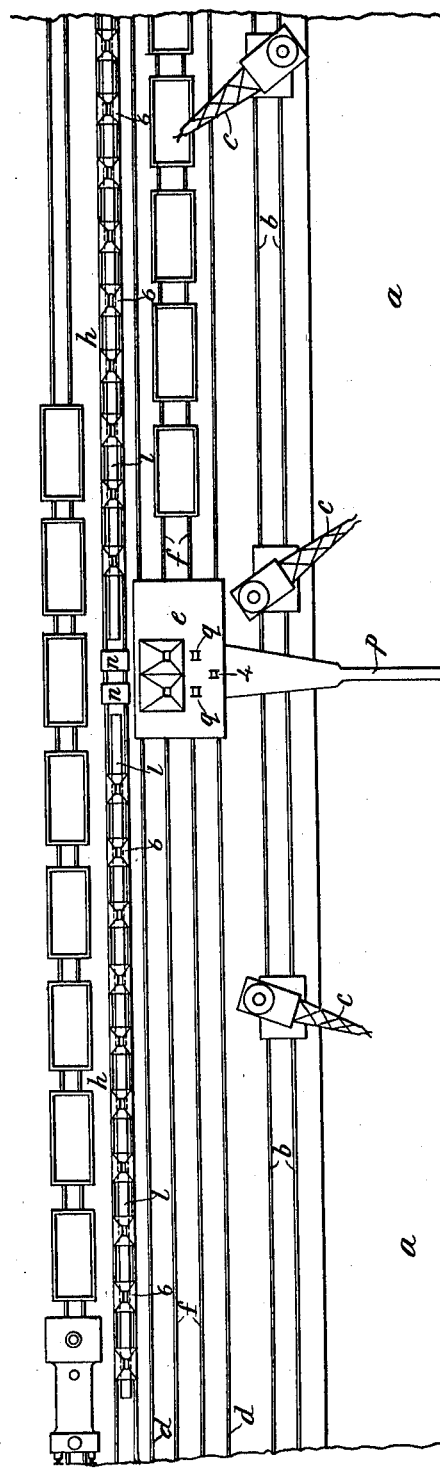

A. GIBB & T. G. MENZIES.
APPARATUS FOR LAYING CONCRETE.
APPLICATION FILED MAR. 29, 1909.
1,004,410.
Patented Sept. 26, 1911.
6 SHEETS—SHEET 3.
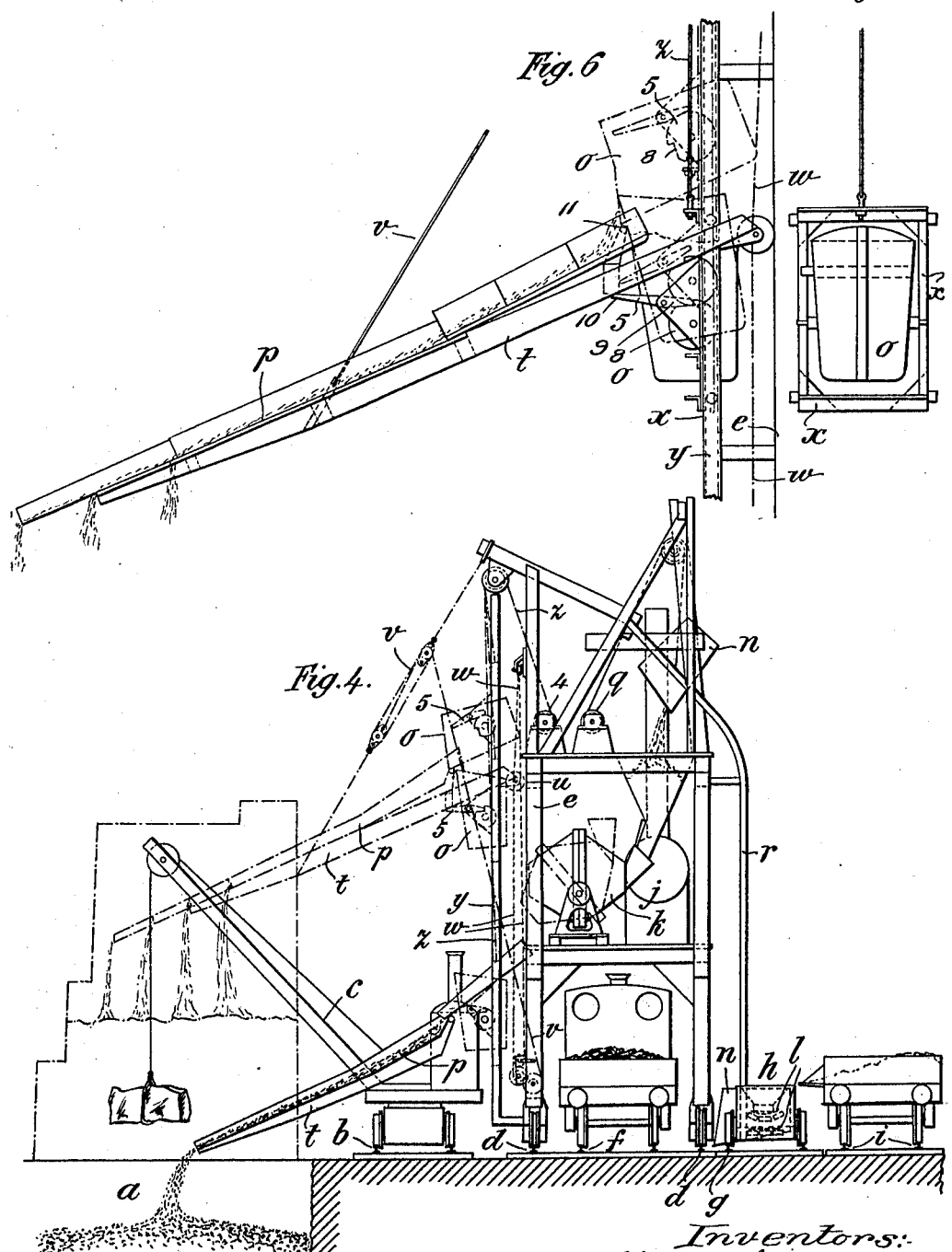

A. GIBB & T. G. MENZIES.
APPARATUS FOR LAYING CONCRETE.
APPLICATION FILED MAR. 29, 1909.

1,004,410.

Patented Sept. 26, 1911.
6 SHEETS—SHEET 4.

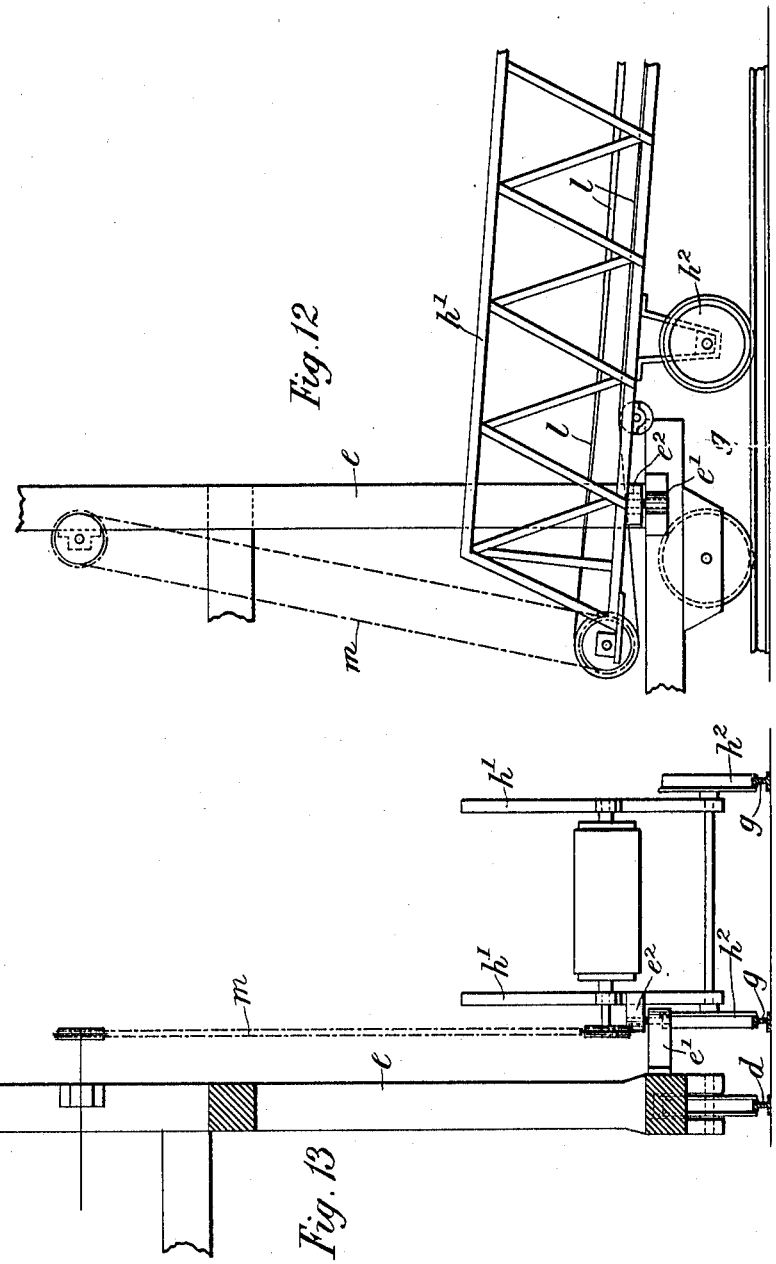

UNITED STATES PATENT OFFICE.

ALEXANDER GIBB, OF PONTYPOOL, AND THOMAS GRAHAM MENZIES, OF LONDON, ENGLAND.

APPARATUS FOR LAYING CONCRETE.

1,004,410.  Specification of Letters Patent. Patented Sept. 26, 1911.

Application filed March 29, 1909. Serial No. 486,566.

*To all whom it may concern:*

Be it known that we, ALEXANDER GIBB and THOMAS GRAHAM MENZIES, subjects of the King of Great Britain, and residents, respectively, of Goytrey House, Pontypool, Monmouthshire, England, civil engineer, and 130 Wollesley road, Chiswick, London, England, civil engineer, have invented new and useful Improvements in Apparatus for Laying Concrete, of which the following is a specification.

The present invention has reference to apparatus for the use of contractors and others employed in work where a large amount of concreting is to be done, as for instance, in making dock walls and the like and the object of the invention is to provide means whereby the work can be carried out more expeditiously than heretofore. In the work of this description it is usual to employ appliances for the excavation and removal of the soil, for the supply of building material, brick, stone, and the like and for the delivery of concrete to the trench. To save time the concreting appliances are made to follow up the excavators and building appliances as closely as possible but there is much delay owing to stoppages in one department to make way for the other to proceed. For instance in certain cases the mixer of the concreting appliance cannot be continuously fed when the supply wagons have to stand aside while wagons for the excavators and builders are being served.

According to this invention the excavating, concreting, and building appliances are so arranged that the work of each can proceed continuously without clashing with the operations of the other.

In carrying our invention into effect we lay alongside the place to be concreted a line of rail upon which move the excavators or the cranes for handling the soil or building materials. Parallel with this line and behind the same is another for the trucks which are to receive the soil dug out of the trench or to feed building materials. Straddling this second line of rail is a track for the concreting machine which is supported on a carriage designed to pass over loaded trucks and locomotives without touching them. At the back of the track of the concreting machine is a track for the trucks which bring supplies for the same and between this track last named and the concreting machine track is a parallel track for the specially designed feeding appliance of the concreting machine which appliance moves to and fro with the latter as it works up and down the track during the progress of the work. Instead of arranging the track for the feeding appliance or conveyer between the concreting machine track and the track of the supply trucks, the former may be arranged if preferred between the lines of the supply truck track, and contents of the trucks may be discharged on to the feeding appliance through trap doors or their equivalent in the said trucks. It may here be convenient to note that the cranes being on one track, the trucks on another, the concreting machine on a third, straddling the trucks, and the second set of trucks for bringing supplies to the concreting machine on a fourth track, all these can pass to and fro without coming into conflict and delaying each other. The concreting machine which we employ is in some respects similar to such machines already in use in that it comprises a mixer of any suitable construction and a telescopic chute for discharging the mixed concrete into the place required. This telescopic chute we propose to mount in such a way that it can be adjusted to any required elevation within limits and we also propose to provide an elevating bucket by means of which the concrete may be lifted from the level of the mixer and delivered to the said chute when the latter is working in its higher positions. The mixer is fed by a system of buckets working vertically and these buckets are kept supplied by the feeding appliance located on the track above referred to and arranged so as to be accessible to a number of men shoveling material on to it simultaneously at a number of different points. This feeding appliance consists of a wheeled carriage attached to and moving with the concreting machine. Upon the carriage are a number of measuring hoppers which can be filled with the ingredients of the concrete from the supply trucks alongside. Beneath the measuring hoppers are traveling belts working toward a central point where the vertical system of buckets above mentioned is situated. Men are continuously employed filling the measuring hoppers which are discharged on to the traveling belts so that the feed of the mixer is kept constantly supplied. By avoiding the necessity of stopping the work in one department for the convenience of another and by keeping the concrete mixer constantly fed a great improvement in the speed of carrying out the work can be effected.

In the accompanying drawings a form of the apparatus is illustrated in which:—

Figure 5:
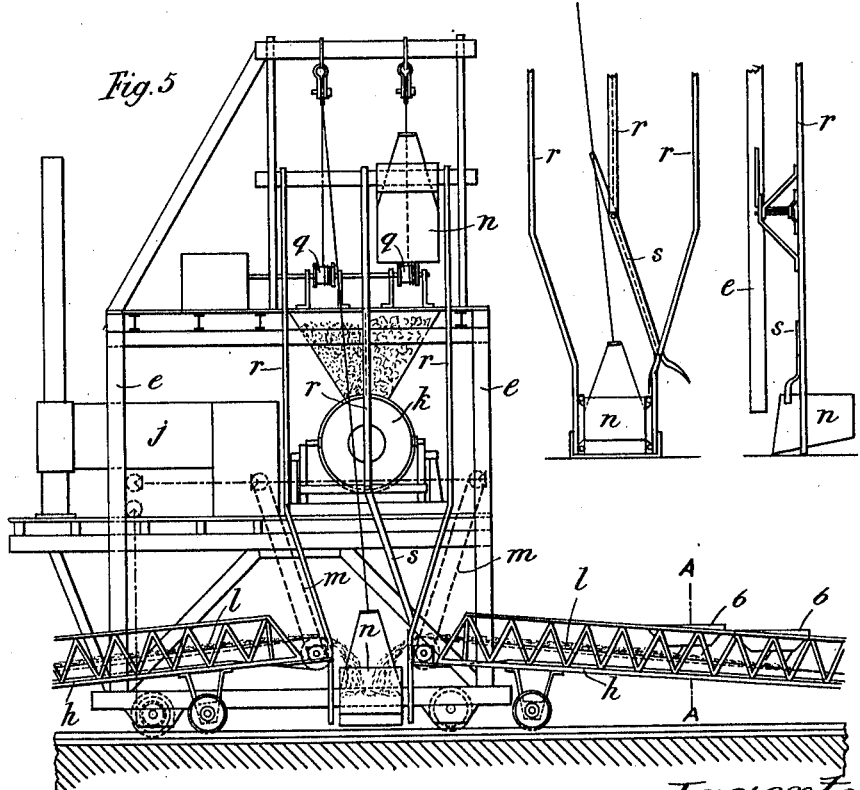
Figure 9:
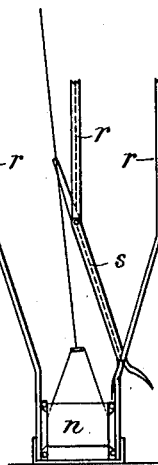
Figure 10:
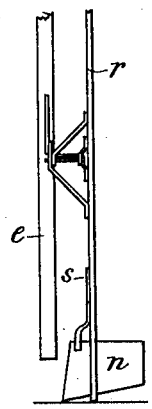
Figure 11:
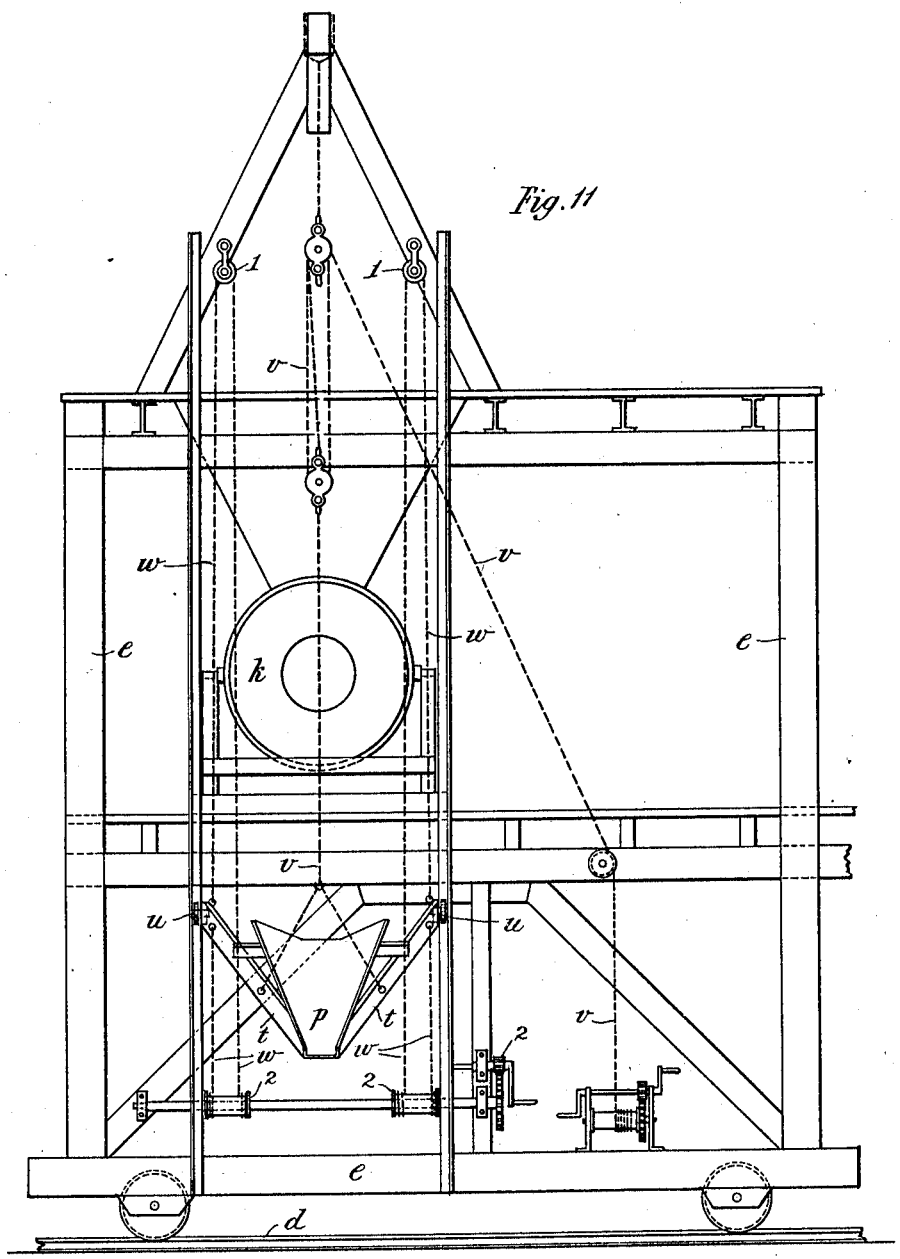

Figure 1 shows diagrammatically in end elevation an apparatus suitable for building a dock wall of concrete according to the system of the present invention. Fig. 2 is a side view, and Fig. 3 is a plan. Fig. 4 is an end view of the apparatus drawn on a larger scale and in greater detail. Fig. 5 is a back view of the concreting apparatus and feeding appliances and supply conveyer. Fig. 6 shows still more enlarged, and in greater detail, the means for feeding and manipulating the discharge chute when in the higher positions. Fig. 7 is a detached view of the bucket which feeds the chute in the higher positions taken at right angles to the view of Fig. 6. Fig. 8 is a cross section, on the line A. A. of Fig. 5 enlarged, of the conveyer. Figs. 9 and 10 are front and side views in detail of the mixer feeding bucket guides. Fig. 11 is an enlarged front view of the discharge chute showing the tackle for moving it up and down. Fig. 12 shows in partial side elevation, and Fig. 13 in end view, a mode of attaching the conveyers to the carriage of the concreting machine.

$a$ is the trench alongside which runs the track $b$ for the excavating appliances which may comprise cranes $c$. Next the track $b$ is a wide track $d$ on which runs the carriage of the concreting machine, which will be described hereafter in greater detail. Between the rails of the track $d$ is a track $f$ of normal gage, which takes the trucks brought up to receive the earth excavated from the trench.

$g$ is a track for the conveyer $h$ which is attached to the concreting machine, and $i$ is a track for the trucks which bring supplies alongside the conveyer $h$. If desired, and circumstances permit, one or more tracks may be arranged on the opposite side of the trench.

The concreting machine $e$ comprises a carriage of any suitable construction supporting an engine and boiler $j$ and a concrete mixer $k$ which may be of any approved type. Driving gear is provided for propelling the carriage along its track $d$, and for working the mixer $k$. The engine also supplies the power for driving the belts $l\ l$ of the conveyer $h$ by means of chains or their equivalent indicated by dotted lines at $m\ m$, power for elevating the mixer feeding buckets $n\ n$, the chute feeding bucket $o$ and the chute $p$ itself.

To feed the mixer $k$ two buckets $n\ n$ are employed which descend alternately into the space between the ends of the divided portions of the conveyer $h$ (see Fig. 5). These buckets are manipulated by cords passing over pulleys to winches $q\ q$.

$r\ r$ are guides for the buckets, and $s$ is a switch with a forked end (see Figs. 9 and 10) hinged centrally and arranged to engage with each bucket and guide it when filled into its proper channel. Ordinary tipping mechanism for the buckets is provided by which the contents are automatically discharged into the hoppers of the mixer $k$.

The buckets $n\ n$ are kept regularly at work under the control of an attendant who operates clutches wherewith the lifting gear is supplied, and the mixer is kept in constant rotation so as to mix up well the ingredients for concrete supplied to it with water which is supplied to the mixer through a flexible hose from a tank preferably carried on the machine. At intervals the mixer is tipped into the dotted position of Fig. 4 to discharge its contents into the chute $p$, or if the said chute is in too high a position as indicated by dotted lines in Fig. 4, into a bucket $o$ which is raised by tackle to the proper height and tipped into the chute $p$. The chute $p$ which is telescopic (see Fig. 6), being composed of several lengths fitting into one another, is fitted to a frame $t$ which carries rollers $u$ running in contact with angle iron guides carried by the frame of the carriage of the machine.

The weight of the fore end of the chute is supported by running tackle $v$ operated by a winch by means of which the inclination can be easily adjusted. The rear end is fastened to the ends of cords $w$ which run over upper pulleys 1 and the barrels of the winch 2, by means of which the chute may be hauled up and down and fixed at the proper height. The bucket $o$ for taking the discharge from the mixer $k$ and delivering it to the chute $p$ is balanced in a frame $x$ raised and lowered in guides $y$ by means of a cord $z$ wound on a drum 4. Trip mechanism 5 is fitted to the bucket $o$ for tipping the same when it arrives at the proper position for feeding the chute $p$. The trip mechanism 5 comprises a notched disk 8 fixed to the side of the bucket $o$, as shown in Fig. 6, and a weighted pawl 9 pivoted to a bracket carried by the frame $x$. The pawl drops into the notch of the disk and serves to hold the bucket, while being raised, in a vertical position. When the bucket is raised to the position to be tipped, a tail piece extension 10 of the pawl 9 comes into contact with the underside of a cross bar of the frame $t$, as shown in Fig. 6. As the bucket continues to move upward the tail piece 10 will cause the pawl to be tipped into a position clear of the notched disk, as shown in dotted lines, Fig. 6, and allow the bucket to tip toward a cross bar 11, against which it will rest by gravity until it reaches the highest dotted position of Fig. 6 and discharges its contents down the chute $p$. The conveyer $h$ by means of which the buckets $n$ $n$ are charged consists of a pair of frames fastened to the carriage of the machine $e$ with which they move to and fro along the track. The side frames $h'$ $h'$ of the conveyers $h$ are carried by a suitable number of pairs of wheels $h^2$ $h^2$ running on the rails $g$ and the pairs are coupled to the framing of the concreting machine $e$, by means of brackets $e'$ $e^2$ projecting from the side of the machine $e$ and the frames $h'$ respectively, so as to insure the conveyers keeping their proper relative position as the concreting machine is moved as the work progresses. These frames carry endless belts $l$ $l$ which are arranged in any suitable manner and are worked from the engine on the machine $e$. The frames may also carry measuring hoppers 6 by means of which the requisite proportions of sand, rubble, etc., may be measured on to the belt from the supply trucks which are run up alongside. If preferred however the measuring hoppers may be dispensed with and the men in the trucks can throw or guide their contents direct on to the belts in which the sand would come from one direction and the rubble from another and join each other in the bucket $n$ where the proportions would be measured by a vertical division while the cement is added by the attendant in the required proportions. To regulate the proportions of the ingredients without the aid of hoppers 6, the attendant will have to watch carefully and regulate the speed of delivery of the belts $l$ $l$ by means of his clutches. In the trench the usual appliances will be used for guiding the concrete to any part desired (see Fig. 1) where the portable chute 7 is shown receiving concrete from the chute $p$.

Having now particularly described and ascertained the nature of our said invention, and in what manner the same is to be performed, we declare that what we claim is:—

1. In combination, a concrete mixer, power driven means arranged to deliver material into the mixer and a power driven conveyer for supplying material to said means, the conveyer being accessible at a plurality of points along its side to receive charges of material simultaneously at several of said points, the relation between the mixer, the delivering means and the number of receiving points along the side of the conveyer being such that the mixer may be operated at full capacity without sacrificing time and conveyer surface.

2. In combination, a concrete mixer, buckets arranged to deliver material into the mixer, a track for guiding a series of supply trucks and a conveyer comprising a traveling band extending alongside the said track to the buckets and accessible throughout its length for the reception of materials from the supply trucks on the track, substantially as and for the purpose set forth.

In testimony whereof we have signed our names to this specification in the presence of the subscribing witnesses.

ALEXANDER GIBB.
THOMAS GRAHAM MENZIES.

Witnesses to the signature of Alexander Gibb:
　WM. WADE,
　JAMES M. SCOTT.

Witnesses to the signature of Thomas Graham Menzies:
　GEO. HUTTON,
　A. MENZIES.

---

Copies of this patent may be obtained for five cents each, by addressing the "Commissioner of Patents, Washington, D. C."